United States Patent [19]
Webster et al.

[11] Patent Number: 5,408,305
[45] Date of Patent: Apr. 18, 1995

[54] METHOD AND APPARATUS FOR ANALYZING NODAL INTERFERENCE PATTERNS VIBRATIONALLY INDUCED IN SEMI-MONOCOQUE STRUCTURE

[75] Inventors: John M. Webster; Jacqueline M. Mew, both of Forest Hills, N.Y.

[73] Assignee: Holographics, Inc., Long Island City, N.Y.

[21] Appl. No.: 108,123

[22] Filed: Aug. 17, 1993

[51] Int. Cl.⁶ .............................................. G01L 1/24
[52] U.S. Cl. ................................... 356/35.5; 73/800; 356/347
[58] Field of Search ...................... 356/35.5, 347, 348; 73/800, 656, 655

[56] References Cited

U.S. PATENT DOCUMENTS

| | | |
|---|---|---|
| 3,911,733 | 10/1975 | Bhuta et al. ............................ 73/800 |
| 4,248,093 | 2/1981 | Andersson et al. ..................... 73/656 |
| 5,065,331 | 11/1991 | Vachon et al. ...................... 356/35.5 |

*Primary Examiner*—Samuel A. Turner
*Assistant Examiner*—Russell C. Wolf
*Attorney, Agent, or Firm*—Brumbaugh, Graves, Donohue & Raymond

[57] ABSTRACT

Methods and apparatus for automatically analyzing anti-nodal patterns formed in the outer skin of a semi-monocoque structure when it is excited to vibrate at a resonant frequency at which out-of-plane displacement is optimized. The described principles of analysis may be utilized to analyze a recorded image of the anti-nodal patterns obtained by holographic interferometry, or to directly examine the anti-nodal pattern by scanning a test area of the surface with a beam of coherent radiation, e.g., a laser beam, and utilizing the Doppler effect, measuring, recording and displaying a contour map showing out-of-plane displacement of the surface for analysis. In the holographic record case, comparison of the fringe density of the anti-nodes against the density of any fringes which may occur along normally fringe-free lines of underlying structure reveals the type and location of any structural faults. In the laser Doppler system, faults are identified by comparing the surface displacement of the anti-nodes with any displacements occurring along lines of the underlying structure.

12 Claims, 5 Drawing Sheets

METHOD AND APPARATUS FOR ANALYZING NODAL INTERFERENCE PATTERNS VIBRATIONALLY INDUCED IN SEMI-MONOCOQUE STRUCTURE

BACKGROUND OF THE INVENTION

This invention relates generally to non-destructive inspection of structures and, more particularly, to apparatus for analyzing nodal patterns induced in the outer skin of monocoque and/or semi-monocoque structures. More specifically, this invention relates to apparatus for analyzing holographic records of nodal patterns obtained by techniques described in copending patent application Ser. No. 08/011,991, filed Feb. 1, 1993 by applicant Webster entitled "Method and Apparatus for Nondestructive Inspection Utilizing Phase Integration and Recording of Induced Vibrating Nodal Patterns", the disclosure of which is hereby incorporated herein by reference.

Briefly, the method described in the aforementioned application includes the steps of mechanically exciting a vibrating nodal pattern in the outer skin of a monocoque structure, panels of which may freely vibrate at one or more resonant frequencies; scanning the frequency of excitation through a predetermined spectrum of frequencies which include such resonant frequencies and locking onto a resonant frequency which is uniquely characteristic of a certain phase relationship of the anti-nodes of the nodal pattern; varying the amplitude of excitation of the structure until the anti-nodes are optimized and when such optimization is reached, recording two time-displaced overlying holograms of the outer skin in synchronism with maximum plus and minus displacement, respectively, of an anti-node. Interference patterns are generated at a separation of approximately one-half wavelength of light, contouring the anti-nodal patterns; this fringe map of contour patterns provides information relating to the integrity of the structure and enables diagnosis of faults, both surface and subsurface.

The present invention is directed to a computer-based system for analyzing nodal patterns induced in the surface of a structure being inspected, either by analyzing a record obtained by holographic interferometry in the manner described in the aforementioned patent application, or by directly scanning, or digitally interrogating point-by-point, the vibrating surface of the structure with a beam of quasi-coherent radiant energy and, utilizing the Doppler effect, reading the out-of-plane displacement of the surface to produce a visual contour map of the surface for capture and analysis by computer. Alternatively, a computer may be programmed to directly capture the nodal pattern and either provide a direct readout of the location and/or identity of structural faults or the nodal pattern is captured directly for later processing.

Accordingly, a general object of the present invention is to improve the speed and accuracy of analysis of the results produced by vibrational techniques for detection of flaws in monocoque and semi-monocoque structures.

Another object of the invention is to provide a system for analyzing a holographic record of nodal patterns induced in the surface of a structure being inspected for diagnosing faults and to provide information relating to the integrity of the structure.

Another object of the invention is to provide apparatus for identifying structural faults in a structure by analysis of images of nodal patterns induced in such structure.

Still another object of the invention is to provide apparatus for identifying structural faults in a structure by quasi-real-time analysis of nodal patterns induced in such structure.

SUMMARY OF THE INVENTION

Briefly, the apparatus according to the invention is a computer-based system for analyzing nodal patterns induced in the surface of the structure being inspected, either by analysis of images of the nodal patterns, such as a holographic interferogram, or by analysis of the actual nodal pattern formed on the structure itself.

For analysis of images of the nodal patterns, the holographic reconstructed image is digitized via a CCD camera into a computer. The image is then scanned along cursor lines which are aligned along regions of interest. While not essential to analysis of the stored image, the image may be visually displayed on a suitable visual display unit (V.D.U.) to enable the operator to do a sight check of where the cursors are relative to the stored image. The computer then indicates when the cursor line is intersected by a fringe line and annotates that point. This information is compared with previously measured information stored in a data base regarding fringe density per anti-node, location of normally fringe-clear areas, or acceptable ratios of fringes existing outside normal anti-nodal patterns to those contained within the anti-nodes and other information which characterize particular types of fault in structures of the kind being inspected, and any faults revealed by the stored image are rapidly and accurately presented to the operator. That is, faults are located and identified automatically, without need for operator judgment, thereby providing assistance to, and possible elimination of the need for an operator, and with it human error at the analysis stage.

Substantially real-time analysis of the actual nodal pattern formed on the surface of a vibrationally excited structure eliminates the time-consuming intermediate step of producing a holographic interferogram by instead forming and storing an "electronic" map of anti-nodal pattern information for comparison with previously measured information of the kind described in the previous paragraph stored in a data base. Such a map of anti-nodal patterns, or the information contained in the anti-node essential to the analysis of a structural fault, preferably is obtained with a scanning or point-by-point Doppler system. Because of the amplitude of the out-of-phase displacements involved in monocoque structures, a laser Doppler system operating in the visible or near visible region of the spectrum has a suitable wavelength and, therefore, provides acceptable sensitivity for this application. Faults are identified by comparing the derived information, which represents essentially a "snap shot" of the surface anti-nodal pattern, with data base information regarding displacement per anti-node, location of normally movement-free areas, etc. The results of the analysis are outputted graphically or textually in a form most useful to the operator.

BRIEF DESCRIPTION OF THE DRAWINGS

Other objects, features and advantages of the invention will become apparent, and its construction and operation better understood, from the following detailed description when read in conjunction with the accompanying drawings in which.

DESCRIPTION OF THE PREFERRED EMBODIMENTS

The present invention is directed to apparatus for facilitating analysis of the results obtained by the vibrational nondestructive inspection technique described in applicant Webster's application Ser. No. 08/011,991 for locating damage and faults in such structures. This earlier technique is based on studies showing that the skin of a semi-monocoque structure, when excited by a vibrator attached to the skin, freely vibrates at a number of resonant frequencies, which have very narrow bandwidths compared to the separation of the resonant frequencies. The panels circumscribed by the skeletal substructure resonate in a uniquely characteristic pattern of nodes and anti-nodes and if the frequency of excitation, or the structural support of a panel is changed, then the nodal pattern changes shape, frequently becoming asymmetric. Observation of changes in the nodal pattern can nondestructively reveal hidden flaws in the substructure and/or in the skin of the structure, providing the observation is made at the instant of maximum out-of-plane displacement of the anti-nodes and satisfaction of certain conditions of phase of the anti-nodes and correct excitation. In the method described in the copending application, changes in the nodal pattern are identified by visual examination of a holographic interferogram obtained by recording two time-displaced overlying holograms of the vibrating outer skin in synchronism with maximum plus and minus displacement, respectively, of an anti-node.

Figure 1:
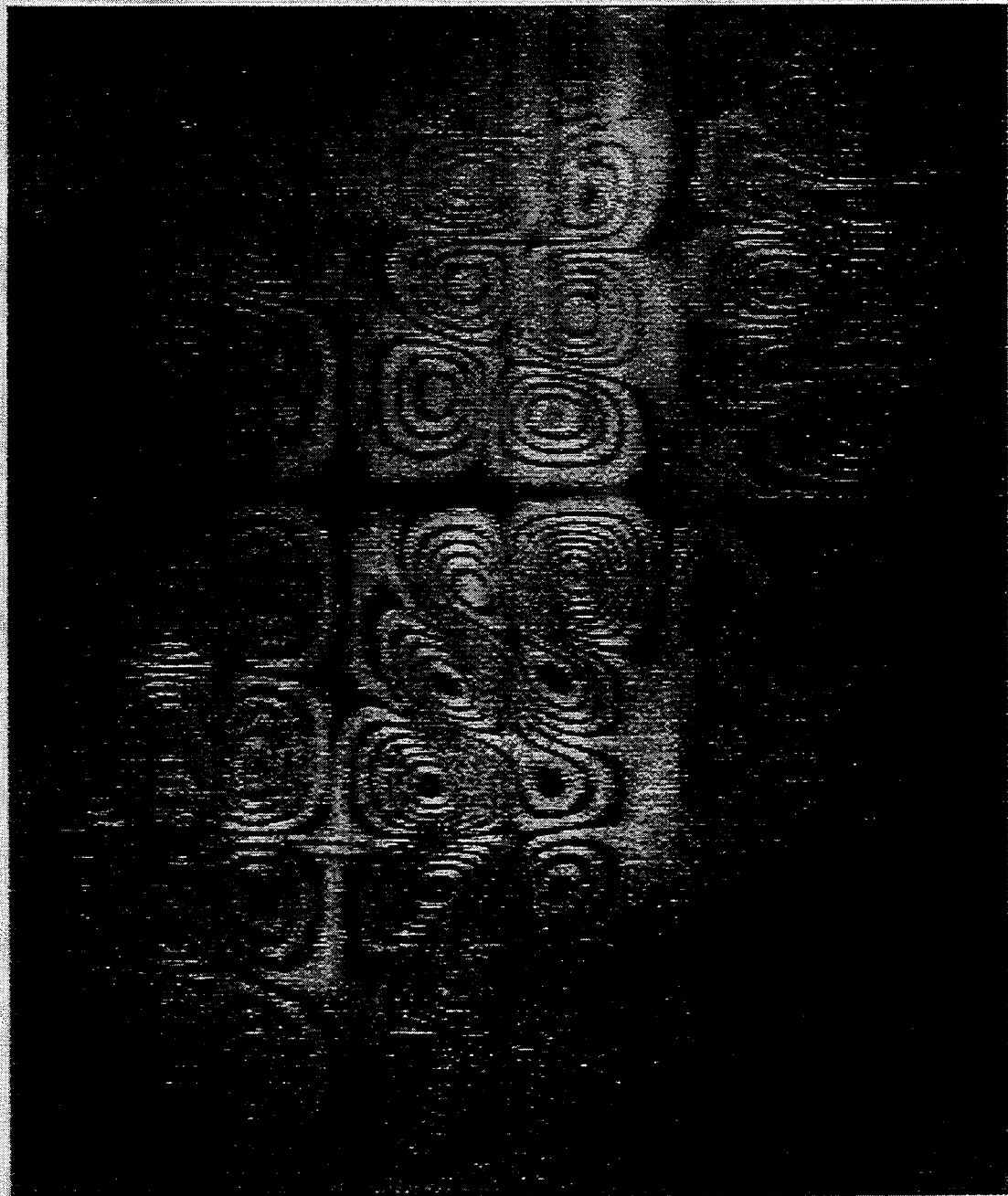
FIG. 1 is a photograph of a holographic interferogram showing a typical pattern of anti-nodal displacements of a vibrating surface.

FIG. 1 is a photograph of a holographic interferogram obtained by the synchronized double-pulsed holographic interferometry technique described in the aforementioned copending application, showing a typical pattern of anti-nodal displacements. Analysis of the actual image indicates that information relating to a structural fault invariably occurs along the lines of the frames and stringers forming the underlying structure. In FIG. 1, the frames and stringers are clearly indicated by relatively fringe-free areas or lines extending horizontally or vertically across the image. When there is a fault in the underlying structure, spurious fringe patterns, or even fully developed anti-nodes, are formed along the frame or stringer. Where an anti-node is less than fully developed, fringes link other similarly phased anti-nodes as the underlying defective structure is pulled by the vibration, or the surface itself is free of the supporting structure and therefore mobile.

Figure 2:
FIG. 2 is a photograph of an interferogram showing linked fringes characteristic of a particular type of fault.
Figure 3:
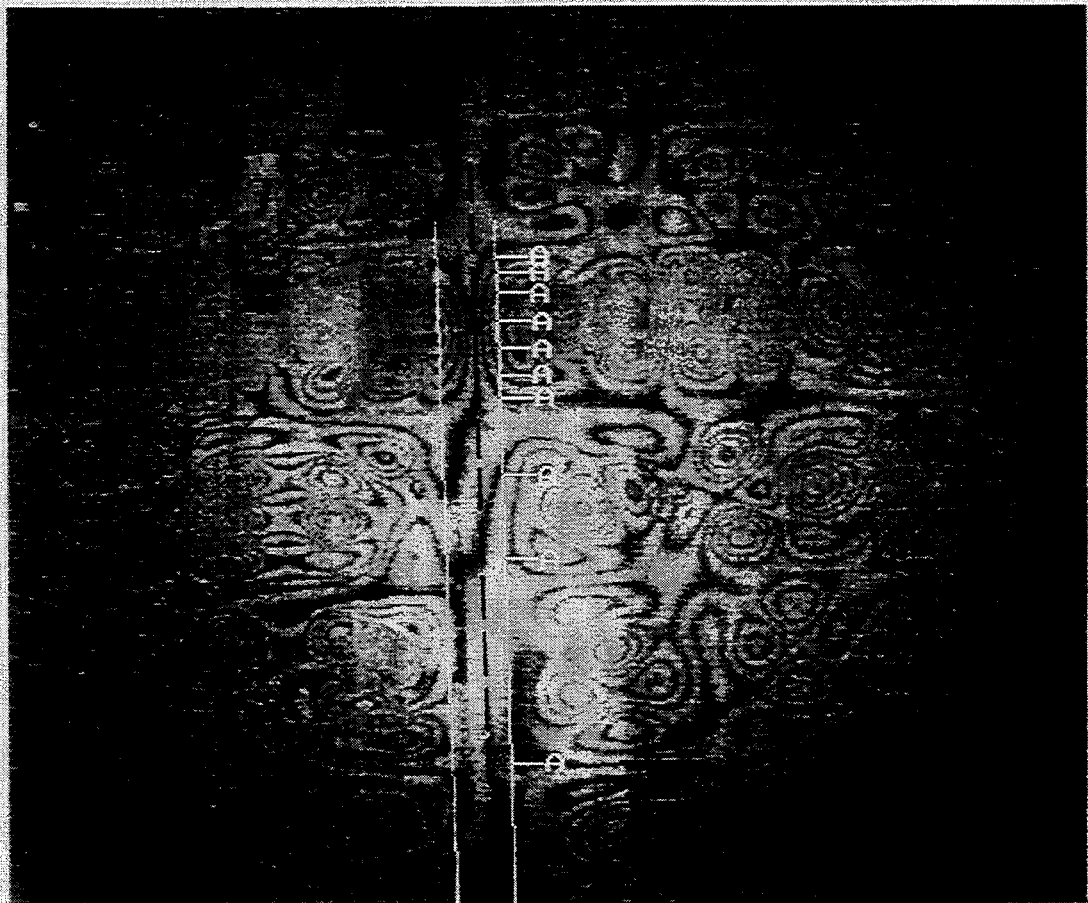
FIG. 3 is a photograph of an interferogram showing fringes intruding into a normally fringe-clear area, characteristic of another type of fault in a semi-monocoque structure.

FIG. 2, a photograph of another interferogram, shows examples of both conditions; namely, linked anti-nodes and the presence of anti-nodes on a normally clear stringer line. In other circumstances, such as depicted by the interferogram of FIG. 3 showing the anti-nodal pattern formed on the vibrationally excited skin surface of the portion of the fuselage of a 737 aircraft that covers a main peripheral, which had suffered corrosion on the cap region, the fringes intrude into the normally fringe-free area along the peripheral. The faults depicted in FIGS. 1–3 are clearly visible and can be reliably identified by visual inspection by a trained operator; however, faults of other kinds may produce more subtle and, therefore, less obvious changes in the anti-nodal pattern and may be overlooked, even by an experienced operator. Accordingly, it is desirable from many aspects to automate analysis of the anti-nodal patterns produced on the vibrating surface of a monocoque structure with a view toward assisting an operator, or possibly eliminating the need for the operator to exercise analytical judgments and thereby minimize the possibility of human error at the analysis stage.

Figure 5:
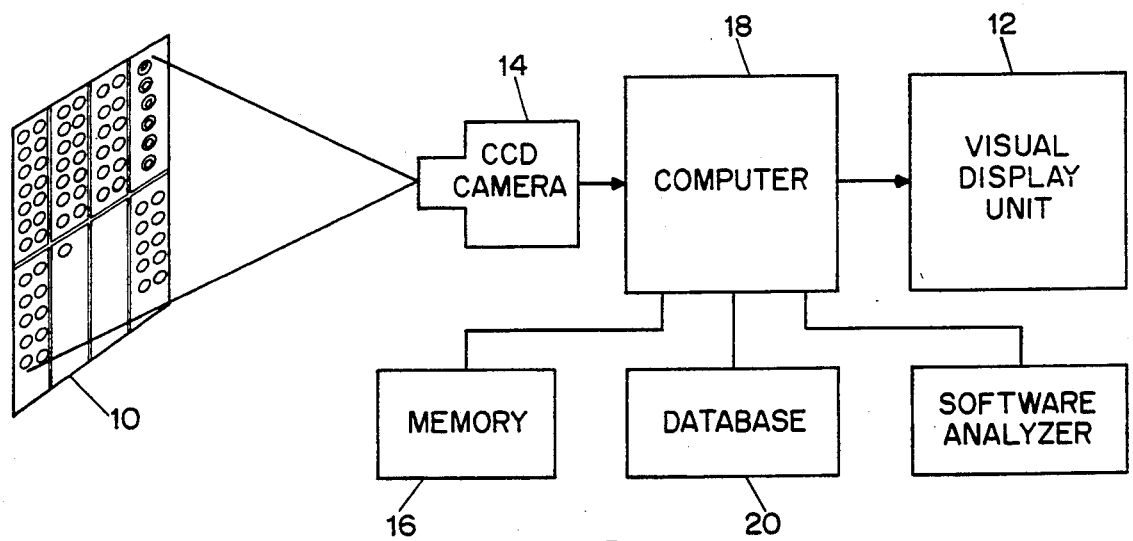
FIG. 5 is a block diagram of a system for analyzing an image of an anti-nodal pattern.

In the case of analyzing nodal patterns by analysis of results or records obtained via holography, the hologram is always reconstructed to produce an image which may be a hard copy 10 as depicted in FIG. 5, an image on a visual display unit 12, or in the form of data within the storage or processor of the analysis equipment. In the specific example depicted in FIG. 5, the holographic reconstructed image, a photograph 10 of a holographic interferogram, is digitized via a conventional CCD camera 14 and entered into the memory 16 of a computer 18, available for display of the interferogram fringe pattern on a visual display unit 12. The displayed image preferably is enhanced, using known computer techniques and software, to facilitate its analysis. This electronically produced and stored image can also be scanned either digitally or in a continuous analog form. The computer compares the stored image-representing information with previously measured information stored in a data base 20, such as information regarding fringe density per anti-node, location of normally fringe-free areas, or acceptable ratios of fringes existing outside normal anti-nodal patterns to those contained within the anti-nodes.

To usefully compare fringe density in the image with that previously stored, it may be desirable to ascertain the size or relative size of an anti-node. This can be achieved with the aid of cursors superimposed on the displayed image, information representing such cursors being stored in data base 20. The cursor is set on the image, either manually by an operator or automatically by the computer software, approximately along one or more lines of anti-nodes. As the anti-nodes forming a line are not always totally aligned, or are not absolutely concentric or identical in a given panel or over a number of different panels, desirably more than one cursor line is set up on the image to insure that the number of fringes in each anti-node located in the area of the image being analyzed are accurately counted. The need for multiple cursors is graphically illustrated in FIG. 4, which diagrammatically lays out a typical anti-nodal pattern with a fault region evidenced by fringes linking across a frame of the underlying structure. As shown, each anti-node is represented by four concentric circles, and the two linked anti-nodes appearing in the lower half of the figure are linked by four fringe lines. To ensure a correct count of the fringe density per anti-node, it being understood that a count is registered each time a cursor line intersects a fringe line, more than one cursor, and in the illustrated example, three cursors A, B and C are set up along three separated, parallel lines of inspection. Cursor B is placed along a line coinciding with an underlying frame which, in the ideal situation should be clear of fringes, and cursors A and C are placed along lines which pass through the center of anti-nodes aligned along respective lines at opposite sides of the frame. In this example, cursors A and C would each produce an average count of eight fringes per anti-node (i.e., the cursor twice intersects each of the four concentric circles).

Figure 4:
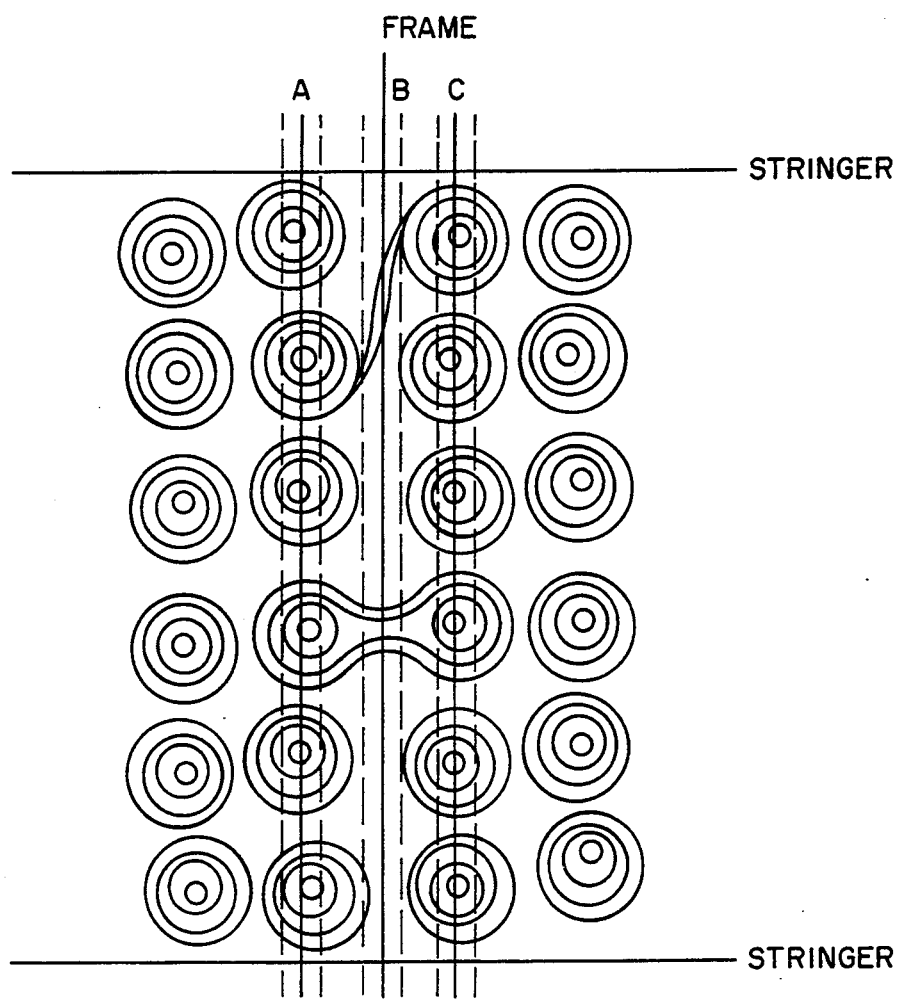
FIG. 4 is a diagram schematically showing a theoretical anti-nodal pattern on which cursor lines for scanning are superimposed.

The cursor B, instead of being clear of fringes as would be the case in the ideal situation, in real situations often intersects fringes that may extend across the frame, such as a stray broad fringe which wanders across a normally static area (top of FIG. 4) or the four fringes shown in the lower half of FIG. 4 which link a pair of anti-nodes across the frame. The four linking fringes are each characterized by narrow width and the fact that they occupy an area having a much narrower width than that of a typical anti-node in the area of the image under analysis. It is seen that cursor B will count the broad fringes at the top of the figure, which span a vertical distance of approximately twice the diameter of an anti-node, and also the narrow linking fringes, which have a high fringe density relative to the anti-nodes. By comparing the fringe count along cursor B with the fringe counts in the adjacent anti-nodes obtained by cursors A and C, the computer determines the existence of approximately a 2:1 ratio, indicating the presence of a fault. It is to be understood that this 2:1 ratio is by way of example only and may have other values in practical applications of the system.

The value of using multiple cursors, with one located over the normally fringe-free line between two others, is clearly seen from FIG. 3 wherein the fault, manifested by two stray broad fringes wandering across the normally static area, otherwise would have been missed by a single cursor scan along either or both lines of anti-nodes aligned along opposite sides of the normally static area.

While the described comparison of information derived from an electronically produced and stored image enables fast and accurate analysis of faults, since it depends for its operation on first producing a holographic record, the procedure is relatively expensive and time-consuming and, obviously, is incapable of providing results in real time. However, because holography reveals exactly what is happening over an entire area when a semi-monocoque structure containing faults is vibrated at resonant frequencies, it has been possible to understand the essential measurements necessary for analysis of such faults and that information which is redundant. Understanding that this type of holographic interferogram is a contour map of out-of-plane motion or displacements, applicants have recognized that such a map of anti-nodal patterns, or the essential information contained in the anti-nodal pattern necessary to make an analysis of a structural fault, can be obtained directly by scanning the vibrationally—excited surface with a scanning or point-by-point Doppler system. The amplitude of out-of-plane motion of the surface of semi-monocoque structures are such that the wavelength of a laser Doppler system operating in the visible or near visible region of the spectrum will provide a suitable measurement sensitivity when backed by appropriate exciters, scanning equipment and computer hardware and software.

Figure 6:
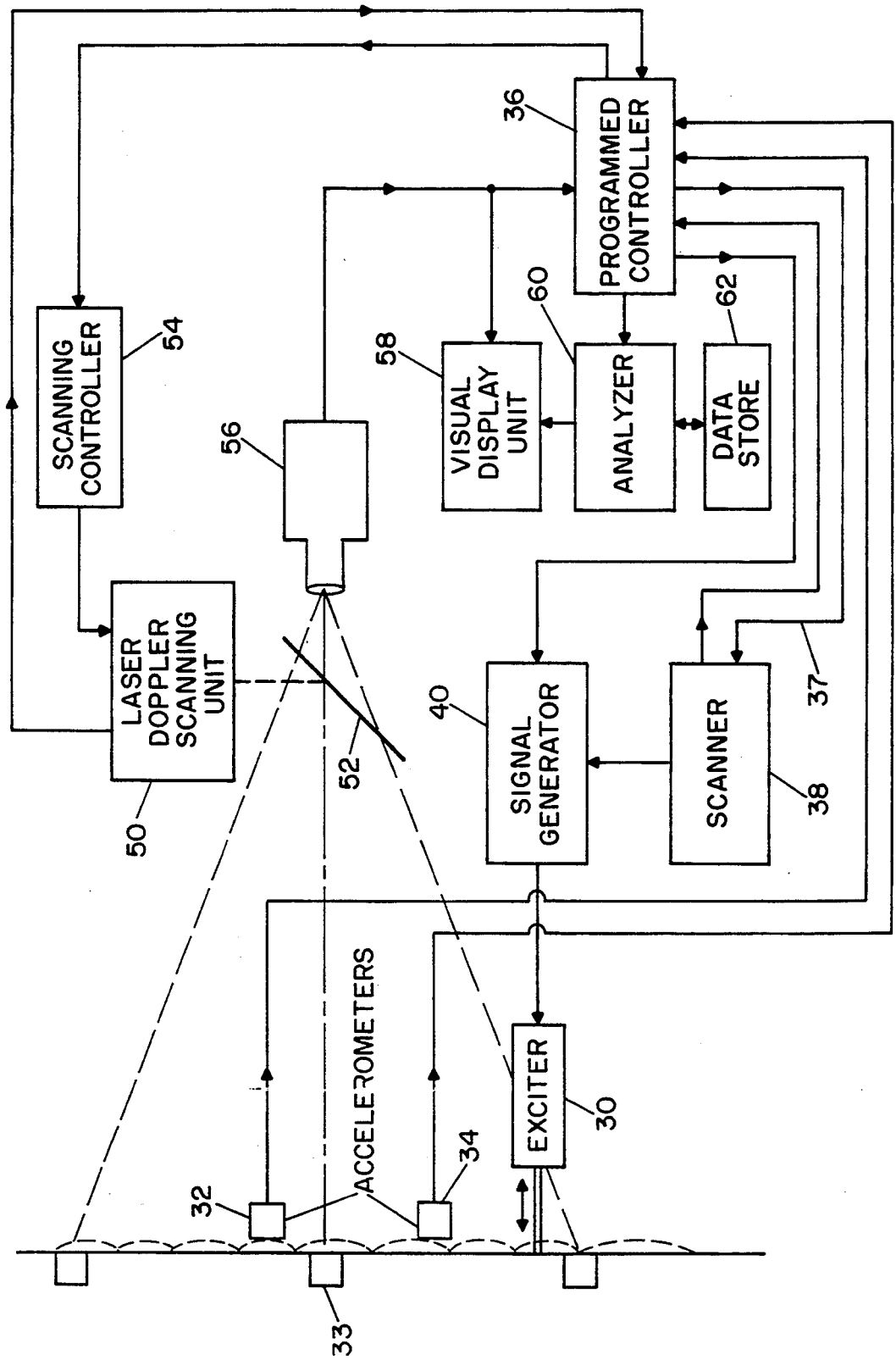
FIG. 6 is a block diagram of a system for analyzing an actual anti-nodal pattern induced in the surface of a structure.

FIG. 6 is a block diagram of a system for quasi-real time analysis of structural faults in semi-monocoque structures consisting of two basic subsystems: a control system for adjusting the displacement of the anti-nodes of a nodal pattern formed on the surface of a vibrationally excited object to optimize out-of-plane motion, and a laser Doppler system for scanning a surface area of interest and measuring the out-of-plane displacements and processing such information to provide a visual display of the type and location of structural faults.

Considering the excitation control system first, an exciter 30, such as a low energy vibrator, is affixed to the surface of the semi-monocoque structure for causing the skin of the structure to vibrate with an out-of-plane motion. Exciter 30 is attached at a likely anti-nodal point, and at least one pair sensors, and preferably two pairs, are arranged to read the surface at likely anti-nodal points for measuring out-of-plane surface displacement; FIG. 6 shows a single pair 32, 34 respectively located on one of a pair of contiguous panels at opposite sides of a stringer 33, at which anti-nodes are likely to occur. The sensors may be any one of several available devices utilized in nondestructed inspection (NDI), such as accelerometers or piezoelectric cells, both of which would be affixed to the surface, or non-contacting sensors such as stationary or scanning laser Doppler vibrometers (an example of one of which will be described hereinbelow) which measure rate of change, and direction, of displacement of the respective anti-nodes. The signals outputted by the sensors, which indicate whether the displacement is coming toward or going away from the viewer along the Z-axis, are applied to a computer-controlled controller 36 programmed to detect resonant frequencies and to determine amplitude of displacement of the observed anti-nodes for a given condition of excitation.

A scanner 38 controlled by controller 36 scans the frequency of a signal generator 38 that drives exciter 30 at a predetermined rate, whereby to scan the exciter through a range of frequencies which encompasses resonant frequencies likely to occur in the structure being inspected. Upon sensing a resonant frequency, derived from say an accelerometer, controller 36 examines the signal to ascertain phase and amplitude of displacement of the anti-nodes and, if indicated, compares the signal's characteristics with stored library information concerning known or expected resonant frequencies and phase information. The controller, via a control line 37, automatically adjusts the amplitude of the signal outputted by signal generator 40, and consequently the energy output of exciter 30, thereby to adjust the amplitude of displacement of the anti-nodes to optimize the anti-nodal pattern. When controller 36 has determined that the characteristics of the anti-nodes that have been sensed satisfy conditions known from previous investigation to reveal a structural fault, it locks onto the resonant frequency and excitation amplitude that gave rise to such satisfaction.

When a satisfactory resonant condition has been arrived at, controller 36 initiates operation of a laser Doppler scanning unit 50 which directs a laser beam onto a beam splitter 52 and which, under control of a scanning controller 54, scans a selected area of interest of the vibrating surface of the structure. Light reflected back from the structure is directed by beam splitter 52 onto the lens of a video camera 56, such as a CCD camera, which digitizes the light signals for storage in the computer and also for storage and processing in programmed controller 36. The scan area of the Doppler scanning unit and the video camera field of view are pre-harmonized to the area to be covered by the optical image. The camera/Doppler system preferably incorporates zoom facilities for optimizing the field of view. Under control of included software, controller 36 supplies relevant data from the Doppler system to an analyzer 60 in which such data is compared with previously measured information stored in a data store 62 regarding motion and displacement per anti-node, location of normally motion free areas, ratios of the amplitude of the anti-nodal displacement normally or motion existing outside or contained within anti-nodal patterns. When such comparison reveals the presence of a fault, an image of the scanned area of the test structure with fault positions indicated thereon, is presented on the visual display unit (V.D.U.) 58, both graphically and digitally.

The described laser Doppler system and associated signal processing hardware and software can, with modification, be implemented with commercially available equipment, such as the PSV-100 scanning laser marketed by Polytec Optronics Inc. of Auburn, Mass. This non-contact, full-field system for vibration measurements combines a laser Doppler vibrometer with a fast scanning system, signal processing circuitry, a high performance computer, video graphics and proprietary software specifically developed for rapid, automated vibration measurement and analysis. The software controls the entire measuring system, including high speed signal processor, A/D converter, laser focus and position, vibrometer electronics and video system. The laser scan system achieves a resolution of 0.01 degrees and a 40×40 degree field of view for scanning large areas without having to move very far back from the test object. The field of view of the video camera is 43 degrees horizontal by 33 degrees vertical with 6× zoom for detailed studies.

Reviewing the operation of the system depicted in FIG. 6, when controller 36 determines that a satisfactory resonance condition of the surface of the test object has been found, it causes scanner unit 50 to start scanning an area of interest which may, for example, present the anti-nodal pattern ideally depicted in FIG. 4. Since the surface displacements are cyclic and repeatable, the scans can be made in sequential order, whereby both positive and negative displacements can be measured with a single Doppler scanning system. Data derived from both positive and negative surface displacements are analyzed in relation to other anti-nodes and the normally motion free lines overlying stringers and frames either after completion of the scanning action, or the analysis may proceed in parallel with the scanning. The actual positioning of the laser scans relative to each other may, if desired, be either automatically or manually adjustable according to the particular measurement, or the position of a fault.

Analysis of the information obtained from the Doppler system is based on the same general principles as those discussed in connection with the analysis of holographic images, except instead of fringe counting, the physical out-of-plane displacement of the actual surface, derived from the frequency and velocity of the out-of-plane motion of the surface is measured and used for comparison with previously measured and stored data. Doppler measurement of the surface condition of the test object also accounts and equates the information viewing angle of the object, the angle of the scan to the surface, differentiation between negative and positive direction of the cyclic motion, and relative surface position (thus the velocity) with respect to the cycle. Alternatively, one may synchronize measurements with a selected phase of the object's vibration cycle, for example anti-node velocity peaks, and if necessary, self-locating onto the center of the actual anti-node, particularly for scans which correspond to cursors A and C in FIG. 4. Scans corresponding to A and C are concerned with measuring anti-node size and its maximum displacement, whereas the B scans are concerned with displacement over any measured area. Analyzer 60 analyzes this information and presents on V.D.U. 58 an image superimposed on the optical image of the scanned area of the test object showing fault positions.

Furthermore, the Doppler scanning system not only can make available the velocity and displacement of the surface being studied, but also the relaxation frequencies which occur subsequent to any excitation. Such relaxation frequencies can be analyzed to identify the character of a fault and its extent. Thus, subsequent to a scan using the excitation technique described in the aforementioned patent application Ser. No. 08/011,911, the fault location being identified, a single short impulse excitation (either by a physically contacting exciter or a remote sonic exciter) can be applied and the now known fault area can be studied to record these relaxation frequencies for analysis.

Although the invention has been described as primarily applicable to nondestructive inspection of semi-monocoque structures, it is apparent that the concepts and principles disclosed herein are equally applicable in the inspection of objects of other forms. Also, while the invention has been described with certain degree of particularity, it is to be understood that the disclosed implementation is by way of example only and that numerous changes in the details of the apparatus may be made without departing from the spirit and scope of the invention.

We claim:

1. A method for nondestructively inspecting for faults in a semi-monocoque structure consisting of an outer skin secured to a framework of underlying structural elements which divide the outer skin into multiple contiguous panels, comprising the steps of:

exciting said outer skin into vibratory motion for forming a pattern therein of out-of-plane anti-nodes separated by lines positionally coinciding with respective underlying structural elements, which lines are normally motion-fee in the absence of faults in a respective underlying structural element and contain fringe patterns when a fault is present in a respective underlying structural element, and analyzing said anti-nodal pattern to determine the structural integrity of said structure by:

electronically scanning an image of said anti-nodal pattern along multiple spaced parallel cursors a centrally-located one of which is substantially coincident with a line which is normally motion-free and at least one other of which is set on said image approximately along a line of anti-nodes for deriving data characterizing the fringe patterns of anti-nodes intersected by said at least one other cursor and indicating whether fringes are present along a line which is normally motion-free;

comparing derived data characterizing fringe patterns of anti-nodes against derived data indicative of the presence of fringes along a line which is normally motion-free for determining whether a predetermined relationship indicative of a structural fault in said structure exists; and responsively to determination of the existence of such predetermined relationship, providing a visual indication of the location and type of said structural fault.

2. The method defined in claim 1, wherein a fringe density count of anti-nodes scanned along said at least one other cursor is compared with a fringe density count of fringes scanned along said one cursor.

3. The method defined in claim 1, wherein said image of said anti-nodal pattern is a previously produced interferogram of said pattern of out-of-plane anti-nodes separated by lines which are motion-free and fringe-free in the absence of faults.

4. The method defined in claim 1, wherein said image of said anti-nodal pattern is an electronic image derived by scanning the vibrationally excited surface of the outer skin of said semi-monocoque structure with a scanning laser Doppler system.

5. The method defined in claim 4, wherein measured out-of-plane displacement of said anti-nodes is compared with any out-of-plane displacement of said outer skin occurring along lines substantially coincident with underlying structural elements of said semi-monocoque structure.

6. The method defined in claim 5, comprising the further steps of providing an optical image of the vibrationally excited outer skin of a fault-free semi-monocoque structure of the type being inspected, and superimposing said measured indication of location and type of structural fault on said optical image.

7. The method defined in claim 5, comprising the further steps of recording and analyzing relaxation frequencies occurring in said semi-monocoque structure subsequent to excitation for identifying the character and extent of a fault.

8. Apparatus for non-destructively inspecting for faults in a semi-monocoque structure consisting of an outer skin secured to an underlying framework of structural elements which divide the outer skin into contiguous panels, comprising:

means for vibrationally exciting the outer skin of said structure for forming therein a pattern of out-of-plane anti-nodes separated by lines positionally coinciding with respective underlying structural elements which are each motion-free except if a structural fault exists in a respective underlying structural element, and apparatus for analyzing said anti-nodal pattern to ascertain whether a structural fault is revealed thereby and, if so, its location and nature, wherein said analysis apparatus comprises:

means for producing an image of said anti-nodal pattern, a computer-based multiple-cursor scanning means for scanning said image along spaced substantially parallel lines, one of which substantially coincides with a respective underlying structural element and at least another of which is set along a first line which passes substantially through centers of anti-nodes aligned along and spaced from said one line, for deriving data characterizing out-of-plane displacement of anti-nodes and any out-of-plane displacement of said outer skin occurring along a line which is normally motion-free; and means responsive to said derived data for comparing the out-of-plane displacement of said anti-nodes with any out-of-plane displacement occurring along a line which is normally motion-free and providing a visual indication of the location and type of structural fault, if any, present in the portion of said semi-monocoque structure represented by said image.

9. The apparatus defined in claim 8, wherein said image-producing means comprises means for producing a holographic interferogram of said anti-nodal pattern.

10. The apparatus defined in claim 8, wherein said apparatus for producing an image of said anti-nodal pattern formed in the vibrationally excited outer skin of said semi-monocoque structure comprises:

a laser Doppler scanning system for scanning said vibrationally excited outer skin with a beam of coherent light, wherein said scanning system includes means for processing light signals reflected back from said outer skin and producing and storing information representing out-of-plane displacements of said outer skin.

11. The apparatus defined in claim 10, wherein said laser Doppler scanning system includes a video camera and a visual display unit for visually displaying the area of said excited outer skin scanned by said scanning system, and wherein said apparatus further comprises means for displaying said visual indication of location and type of fault on said visual display unit superimposed on the displayed area of said excited outer skin.

12. The apparatus defined in claim 11, wherein said apparatus further comprises means for recording and analyzing relaxation frequencies occurring in said semi-monocoque structure subsequent to excitation for identifying the character and extent of a fault.

* * * * *

UNITED STATES PATENT AND TRADEMARK OFFICE
CERTIFICATE OF CORRECTION

PATENT NO. : 5,408,305
DATED : Apr. 18, 1995
INVENTOR(S) : Webster et al.

It is certified that error appears in the above-indentified patent and that said Letters Patent is hereby corrected as shown below:

On the title page:

<u>Item 56</u>, following last line, insert:

--OTHER PUBLICATIONS

Pulsed Holographic Nondestructive Testing on Aircraft by Fagot et al.; SPIE Vol. 369 Max Born; pages 493-496.

Holograph Nondestructive Evaluation: Status and Future by G. Birnbaum et al., International Advances in Non-destructive Testing, 1983, Vol. 9, pp. 257-282.--

<u>Col. 6, line 25</u>, "nondestructed" should read --nondestructive--.

Signed and Sealed this

Twentieth Day of August, 1996

*Attest:*

BRUCE LEHMAN

*Attesting Officer*   *Commissioner of Patents and Trademarks*